(12) United States Patent
Bamford

(10) Patent No.: US 7,051,483 B2
(45) Date of Patent: May 30, 2006

(54) LAMINATE CONCRETE PANEL

(75) Inventor: Guy Bamford, Oak Lane Cottage, The Row, Trigon, Wareham, Dorset BH20 7PF (GB)

(73) Assignee: Guy Bamford, Dorset (GB)

( * ) Notice: Subject to any disclaimer, the term of this patent is extended or adjusted under 35 U.S.C. 154(b) by 0 days.

(21) Appl. No.: 10/445,281

(22) Filed: May 23, 2003

(65) Prior Publication Data

US 2004/0231273 A1 Nov. 25, 2004

(51) Int. Cl.
*E04B 1/18* (2006.01)
(52) U.S. Cl. .................................... 52/414; 312/140.1
(58) Field of Classification Search ................ 52/414, 52/380, 381; 312/140.3, 140.1; 249/15; 264/133, 162, 236, 256, 308, 347
See application file for complete search history.

(56) References Cited

U.S. PATENT DOCUMENTS 6,112,487 A   9/2000   Shaw et al.

FOREIGN PATENT DOCUMENTS

| DE | 3103007 A | 9/1982 |
| ES | 2010148 A | 10/1989 |
| GB | 658743 | 10/1951 |
| JP | 5302406 A | 11/1993 |
| JP | 000204285 A | 7/2000 |

OTHER PUBLICATIONS

"How Are Concrete Countertops Made?", Feb. 2000, ConcreteNetwork.com, pp. 1-5.*

"Acrylic/Epoxy Sealants for Concrete Floors", Aug. 2000, Melrosechem.com, pp. 1-2.*

"EpoxySystems' Product #671", 1994, Epoxy.com, pp. 1-3.*

(Continued)

*Primary Examiner*—Naoko Slack
(74) *Attorney, Agent, or Firm*—Christensen O'Connor Johnson Kindness PLLC

(57) ABSTRACT

A concrete laminate panel (1) comprising a sealant layer (2), a first layer of concrete (4), a second layer of concrete (6), and a backing board (8). The sealant layer (2) is a transparent, wear-resistant material, such as a urethane material. The sealant layer (2) provides a waterproof and alcohol-resistant layer with excellent wear properties, both in a dry and a wet condition, plus an ultraviolet filter to prevent yellowing. A two-stage, two-part polyurethane material comprises these properties, and we have found this material to be particularly useful as a sealant layer. The transparent nature of the sealant layer (2) allows the uppermost surface of the first layer of concrete (4) to be viewed therethrough. The urethane material contains an anti-microbial additive that will inhibit the growth of bacteria, fungi, molds, mildew, and algae. The first layer of concrete (4) provides a viewable thin, hardened, and decorative surface. The first layer of concrete (4) is wet bonded and cross-cured to the second layer of concrete (6). The second layer of concrete (6) comprises a fiber-reinforced concrete material and provides improved tensile strength for the laminate concrete panel (1). The backing board (8) may be any suitable fibrous board, such as MDF. The backing board (8) is bonded to the second layer of concrete (6).

34 Claims, 3 Drawing Sheets

OTHER PUBLICATIONS

"Concrete Sealer X-1", 1997, Stone Technologies Corp., pp. 1-3.*

"Build A Counter That Will Make A Lasting Impression", May 1999, Decorative Concrete Net, pp. 1-2.*

"STRUCTAN", Dec. 1998, ExcelGlue.com, pp. 1-2.*

"Frequently Asked Questions", Oct. 2002, Color Crete Design, pp. 1-2.*

"Styrene Butadiene", May 2002, DOW Reighhold Specialty Latex LLC, p. 1.*

* cited by examiner

LAMINATE CONCRETE PANEL

FIELD OF THE INVENTION

The present invention relates to a laminate concrete panel and a method for manufacturing a laminate concrete panel, and is concerned particularly, although not exclusively, with a prefabricated laminate concrete panel for a work surface.

BACKGROUND OF THE INVENTION

Existing work surfaces made from concrete, such as a kitchen work surface, are manufactured on site in the kitchen. The concrete is poured into a bespoke trough mold, leveled, and allowed to cure.

SUMMARY OF THE INVENTION

According to a first aspect of the present invention, there is provided a laminate concrete panel comprising a first layer of concrete and a layer of sealant substantially covering an outer surface of the first layer of concrete.

The outer surface of the first layer of concrete is preferably etched.

Preferably, the sealant is substantially transparent such that the outer surface of the first layer of concrete beneath the sealant is viewable through the layer of sealant.

Preferably, the layer of sealant comprises a polished outer surface.

The layer of sealant is preferably wear resistant.

Preferably, the layer of sealant comprises a tolerance to heat when dry and when wet.

The layer of sealant preferably comprises a polyamide reactive polymer primer and a urethane material.

Preferably, the layer of sealant comprises a two-part, 100% solids, urethane material.

The urethane material preferably contains an anti-microbial additive. The anti-microbial additive helps to inhibit the growth of bacteria, fungi, molds, mildew, and algae.

The laminate concrete panel preferably comprises a second layer of concrete bonded to the first layer of concrete.

The second layer of concrete preferably comprises a fiber-reinforced structure.

The second layer of concrete preferably comprises a glass fiber reinforced structure.

Preferably, the second layer of concrete is wet bonded to the first layer of the concrete.

The laminate concrete panel preferably comprises a backing board.

Preferably, the backing board is bonded to the second layer of concrete.

The backing board is preferably bonded to the second layer of concrete using a polyurethane thixotropic gel.

The backing board is preferably a fiberboard material.

Preferably, the first layer and second layer of concrete each comprises fine sand.

The particle size of the fine sand is preferably in the range of 0.1 mm to 1.5 mm.

The first layer of concrete preferably comprises a greater mass of fine sand per kg than the mass of fine sand per kg of the second layer of concrete.

Preferably, the first layer and secon layer of concreate each comprises an inorganic hydraulic binder.

Preferably, the first layer and second layer of concrete each comprises Portland cement.

The first layer of concrete preferably comprises a greater mass of cement per kg than the mass of cement per kg of the second layer of concrete.

Preferably, the first layer and second layer of concrete each comprises silica fume.

The first layer of concrete preferably comprises a greater mass of silica per kg than the mass of silica per kg of the second layer of concrete.

Preferably, the first layer of concrete comprises a pigment.

The first layer preferably comprises an acrylic co-polymer.

Preferably, the first layer comprises a water-reducing agent.

The first layer preferably comprises a pure acrylic co-polymer and/or a high range water-reducing agent.

Preferably, the second layer of concrete comprises a pigment.

The second layer preferably comprises a styrene butadiene.

Preferably, the second layer comprises a water-reducing agent.

The second layer preferably comprises a high range water-reducing agent and a styrene butadiene.

The cross-sectional thickness of the second layer of concrete is preferably greater than the cross-sectional thickness of the first layer of concrete.

The cross-sectional thickness of the second layer of concrete is preferably less than the cross-sectional thickness of the backing board.

Preferably, in use, the second layer of concrete provides tensile and flexural strength for the laminate concrete panel.

It is also preferable that the first layer of concrete comprises a hardened decorative surface concrete material.

The laminate concrete panel is preferably prefabricated.

According to a second aspect of the present invention, there is provided a method for manufacturing a laminate concrete panel, the method comprising (1) placing a mixture of concrete in a mold and allowing the concrete to set; (2) etching an outer surface of the concrete; and (3) covering the etched outer surface of the concrete with a sealant.

The layer of concrete is preferably bonded to a backing board.

Preferably, before the etching of the outer surface of they layer of concrete, the outer surface is prepared by a grinding process.

The grinding process is preferably followed by a polishing process prior to the etching of the concrete outer surface.

According to a third aspect of the present invention, there is provided a method for manufacturing a laminate concrete panel, the method comprising (1) forming an inner concrete layer by placing a first mixture of concrete in a mold and allowing the concrete to attain initial set; (2) forming an outer concrete layer by placing a second mixture on the inner layer of concrete and allowing the second mixture of concrete to set; (3) etching an outer surface of the outer concrete layer; and (4) covering the outer surface of the outer concrete layer with a sealant.

The inner layer of concrete is preferably bonded to a backing board.

Preferably, before the etching of the outer surface of the outer concrete layer, the outer surface of the outer concrete layer is prepared by a grinding process.

The grinding process is preferably followed by a polishing process prior to the etching of the outer surface of the outer concrete layer.

The etching removes the cement from between the polished and exposed aggregate, and thus the top of the surface.

A primer is preferably sprayed onto the outer surface of the outer layer of concrete.

The sealant is preferably spread using a brush and squeegee-type device.

Preferably, before the second mixture of concrete is placed on the inner layer of concrete, an outer surface of the inner layer of concrete is prepared by a grinding process.

The ground surface of the inner layer of concrete is preferably covered with a styrene butadiene before the second mixture of concrete is placed on the inner layer of concrete.

The invention may include any combination of the features or limitations referred to herein.

The present invention may be carried into practice in various ways, but various embodiments will now be described, by way of example only, with reference to the accompanying drawings.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
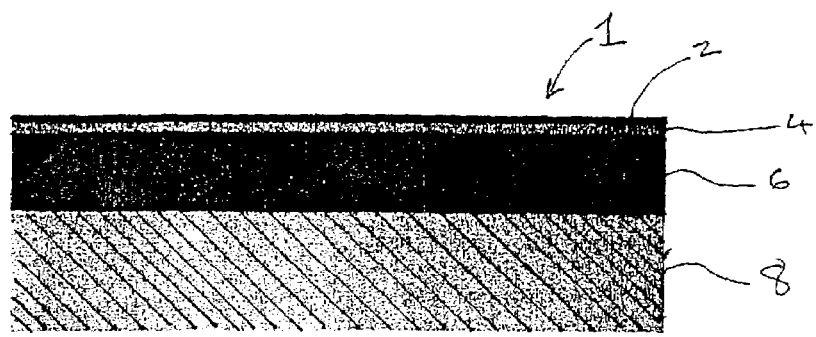
FIG. 1 is a cross-sectional view of a concrete laminate panel.
Figure 2:
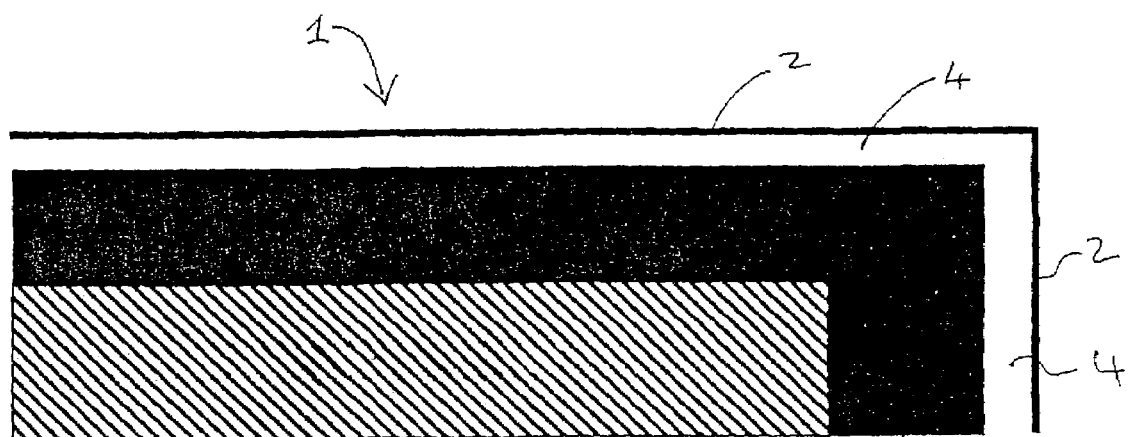
FIG. 2 is a cross-sectional view of a front portion of a concrete laminate panel.

With reference to FIGS. 1 and 2, there is shown a cross section of a concrete laminate panel 1 comprising a sealant layer 2, a first layer of concrete 4, a second layer of concrete 6, and a backing board 8.

The sealant layer 2 is a transparent, wear-resistant material such as a urethane material. The sealant layer 2 provides a waterproof and alcohol-resistant layer with excellent wear properties, both in a dry and a wet condition, plus an ultraviolet filter to prevent yellowing. A two-stage, two-part polyurethane material comprises these properties, and we have found this material to be particularly useful as a sealant layer. The transparent nature of the sealant layer 2 allows the uppermost surface of the first layer of concrete 4 to be viewed therethrough. The urethane material contains an anti-microbial additive that will inhibit the growth of bacteria, fungi, molds, mildew, and algae.

The first layer of concrete 4 provides a viewable thin, hardened, and decorative surface. The first layer of concrete 4 is wet bonded and cross-cured to the second layer of concrete 6. The second layer of concrete 6 comprises a fiber-reinforced concrete material and provides improved tensile strength for the laminate concrete panel 1.

The backing board 8 may be any suitable fibrous board, such as MDF. The backing board 8 is bonded to the second layer of concrete 6.

The cross-sectional thickness of the first layer of concrete 4 is preferably less than the cross section thickness of the second layer of concrete 6. The typical weight of a laminate concrete panel 1 having a cross section thickness of 40 mm is approximately 45 kg per $m^2$.

The component parts of the first layer of concrete 4 and the second layer of concrete 6 are shown in the table below.

Component Parts of First and Second Layer
COMPONENT
FIND SAND (KILN DRIED)
WHITE PORTLAND CEMENT
SILICA FUME (ELKEM 983U)
PIGMENT (BAYFERROX 9100R OTHER)
WATER
HIGH RANGE WATER REDUCER (ADVA 510)
GLASS FIBER (CEMFIL 13H350Y)
STYRENE BUTADIENE (50% AQUEOUS DISPERSION)
PURE ACRYLIC CO-POLYMER (50% AQUEOUS DISPERSION)

The skilled person in the art will appreciate that the type of sand, the type of cement, the type and proportions of pigment, and the amount of water may be altered, depending on the color to be produced.

The process of manufacturing the prefabricated laminate concrete panel 1 generally consists of first placing a mix for the second layer of concrete 6 into a mold and leveling out the mix flat to the height of the sides of the mold and allowing the mix to cure until the onset of an initial set. The top surface of the second layer of concrete 6 is then sanded such that the uppermost portion is removed. The sides of the mold are upwardly adjusted, inserts are removed from the edges, where necessary, and a mix for the first layer of concrete 4 is then placed into the mold. The mix is leveled and shortly afterward sprayed with a solvent-based acrylic sealant that is allowed to cure. Once the mix for the first layer of concrete 4 has cured, an uppermost surface thereof is then ground down and later, when fully cured, diamond polished to a smooth level finish. The surface of the first level of concrete 4 is then acid etched and a polyamide reactive co-polymer primer is then sprayed onto the etched surface, followed by a urethane sealant that is brushed and squeegeed onto the primed surface.

Figure 3A:
FIGS. 3a–3d are a series of cross-sectional views of the upper portion of the concrete laminate panel and show various stages of a method of manufacture.
Figure 3B:
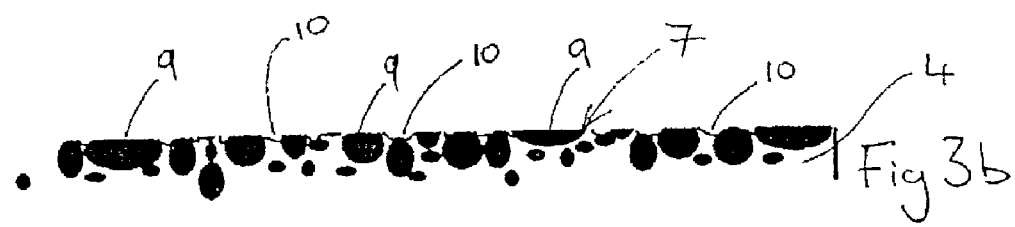
Figure 3C:
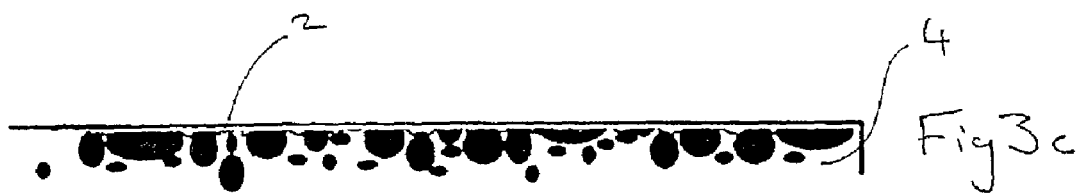

With reference to FIGS. 3a–3d, there is shown in more detail the preparation of the top surface of the first layer of concrete 4 and the application of sealant layer 2. FIG. 3a shows an outer top surface 5 of the first layer of the concrete 4. This outer top layer 5 is diamond polished so that it is even and flat. The outer top surface 5 is then acid etched so that the cement around the sand aggregate 9 is etched away to leave an uneven surface 7 comprising the sand aggregate 9 and formed with hollows 10, as shown in FIG. 3b. The outer surface is sprayed with a high monomer polyamide reactive polymer primer that substantially evaporates. The hollows 10 are then filled with a clear urethane sealant and the sand aggregate 9 is covered with the sealant 2. The surface is sprayed level with the urethane sealant containing an additional monomer substance and allowed to harden, leaving sealant layer 2 flat and smooth, as shown in FIG. 3c.

Figure 3D:
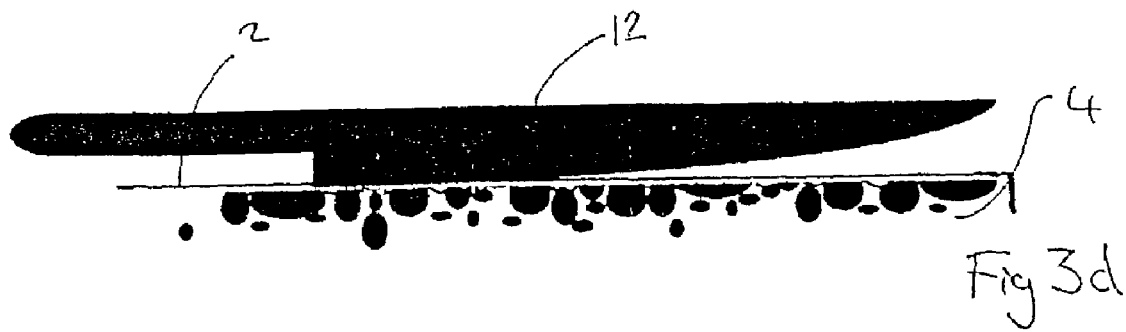

With reference to FIG. 3d, when a knife 12 is drawn across the surface of the sealant layer 2, the knife edge may cut through the outermost surface layer of the sealant layer 2, but cannot cut further into the hollows 10 due to the protruding aggregate 9. The aggregate 9 has a hardness that is greater than the hardness of the steel blade of the knife 12, and this prevents the blade of the knife 12 cutting further through the sealant layer 2. This feature leaves the vulnerable cement within the concrete mix of the first layer of concrete 4 protected by the sealant and the hardness of the aggregate 9.

A more detailed method of manufacture is provided below.

A mix for the second layer of the concrete 6 is first placed into a mold. The outermost surface of the second layer of concrete 6 is then leveled, dampened, covered, and left to cure. Once the onset of initial set has been attained, the top surface of the second layer of concrete is ground until level and of an even thickness. The sides of the mold are then adjusted upwardly to provide the thickness of the first layer of concrete 4 and any inserts are removed from the sides, if necessary. The top surface of the second layer of concrete 6 is painted with a styrene butadiene and the mixture of the first layer of concrete 4 is placed into the mold, the surface thereof is leveled until smooth and flat. Later, the surface is sealed with an acrylic sealant spray and left to cure. Once cured, the top surface of the first layer of concrete 4 is sanded flat and smooth.

Prior to being placed in the mold, the components of the first layer of concrete are preferably mixed together in a substantial vacuum using suitable apparatus.

The mold is then removed and the edges of the laminate concrete panel 1 are sanded. The top surface of the first layer of concrete 4 is ground with a wet grinding stone. The panel is left for a period of time and then the top surface of the concrete is polished with a green grade diamond composite stone. The panel is left for a period and then polished with a green and black grade diamond composite stone. After a period of time, the top surface of the first layer of concrete 4 is washed and acid etched. After a period of time, three coats of primer and sealant are applied and left until hardened. Finally, an MDF board is bonded to the lowermost surface of the second layer of concrete 6.

Figure 4:
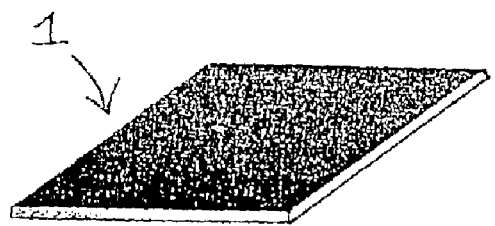
FIGS. 4–8 are isometric views of various forms of concrete laminate panels.

FIG. 4 shows a concrete laminate panel 1 without a backing board.

Figure 5:
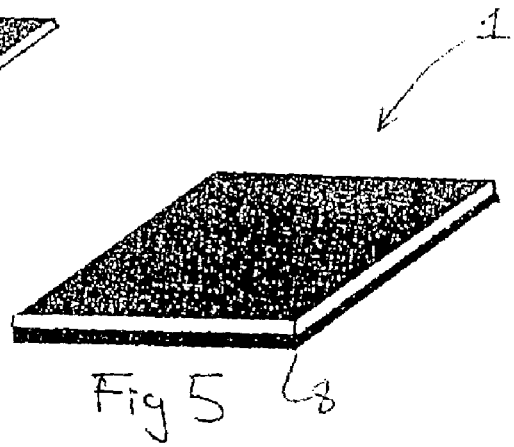

FIG. 5 shows a concrete laminate panel 1 with a backing board 8

Figure 6:
Figure 7:
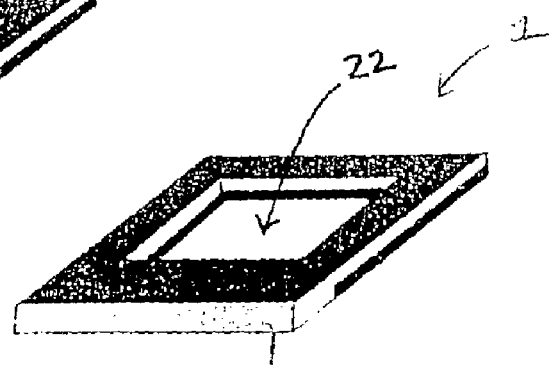
Figure 8:
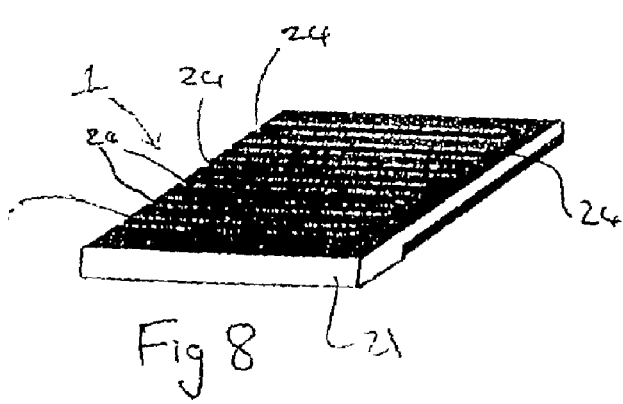

FIG. 6 shows a concrete laminate panel 1 comprising a front edge portion 21 formed by the first layer of concrete 4. FIG. 7 shows a concrete laminate panel 1 comprising a front edge portion 21 formed by the first layer of concrete 4 and being formed with a square cutout portion 22. The cutout portion 22 may be of any desired shape. FIG. 8 shows a concrete laminate panel 1 comprising a front edge portion 21 formed by the first layer of concrete 4 and being formed with a plurality of grooves 24 to form a kitchen draining board.

The laminate concrete panel 1 may be formed into any shape or easily profiled to fit a particular interior design concept. The laminate concrete panel 1 may be used for most work surfaces, such as kitchen worktops, bathroom vanity tops, countertops, bar tops, table tops, sideboards, garden furniture, coffee tables, interior panels, shelves, or hearths. The edges of the laminate concrete panel 1 may be shaped to form a particular profile, such as single pencil round, a double rounded arris, a full deco, or a full bullnose.

The laminate concrete panel 1 is a strong, dense sheet material with a lightweight core. The use of different colored pigments provides for a wide range of stone effects, such as but not limited to, limestone white, sandstone white, mid-Portland gray, shale gray, pitch black, basalt black, chalk white, and industrial Portland gray. Any variation in color or surface detail and texture may be provided by alteration of the concrete mix and/or the pigment. The invention provides a convenient prefabricated product ready for installation on site.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A laminate concrete panel comprising a first layer of concrete and a layer of sealant substantially covering an outer surface of the first layer of concrete wherein the laminate concrete panel further comprises a second layer of concrete cross cured to the first layer of concrete, the first layer of concrete comprising a hardened decorative surface concrete material and the second layer of concrete, in use, providing tensile and flexural strength for the laminate concrete panel, the first layer of concrete being applied to the second layer of concrete after the second layer of concrete has cured at least to onset of initial set, the cross-sectional thickness of the second layer of concrete being greater than the cross-sectional thickness of the first layer of concrete.

2. A laminate concrete panel as claimed in claim 1, wherein the outer surface of the first layer of concrete is etched.

3. A laminate concrete panel as claimed in claim 1, wherein the sealant is substantially transparent such that the outer surface of the first layer of concrete beneath the sealant is viewable through the layer of sealant.

4. A laminate concrete panel as claimed in claim 1, wherein the layer of sealant comprises a polished outer surface.

5. A laminate concrete panel as claimed in claim 1, wherein the layer of sealant is wear resistant.

6. A laminate concrete panel as claimed in claim 1, wherein the layer of sealant comprises a tolerance to heat when dry and when wet.

7. A laminate concrete panel as claimed in claim 1, wherein the layer of sealant comprises a polyamide reactive polymer primer and a urethane material.

8. A laminate concrete panel as claimed in claim 7, wherein the layer of sealant comprises a two-part, 100% solids, urethane material.

9. A laminate concrete panel as claimed in claim 7, wherein the urethane material contains an anti-microbial additive.

10. A laminate concrete panel as claimed in claim 1, wherein the second layer of concrete comprises a fiber-reinforced structure.

11. A laminate concrete panel as claimed in claim 1, wherein the second layer of concrete comprises a glass fiber reinforced structure.

12. A laminate concrete panel as claimed in claim 1, wherein the second layer of concrete is wet bonded to the first layer of the concrete.

13. A laminate concrete panel as claimed in claim 1, wherein the laminate concrete panel comprises a backing board.

14. A laminate concrete panel as claimed in claim 13, wherein the backing board is bonded to the second layer of concrete.

15. A laminate concrete panel as claimed in claim 14, wherein the backing board is bonded to the second layer of concrete using a polyurethane thixotropic gel.

16. A laminate concrete panel as claimed in claim 13, wherein the backing board is a fiberboard material.

17. A laminate concrete panel as claimed in claim 13, wherein the cross-sectional thickness of the second layer of concrete is less than the cross-sectional thickness of the backing board.

18. A laminate concrete panel as claimed in claim 1, wherein the first layer and second layer of concrete each comprises fine sand.

19. A laminate concrete panel as claimed in claim 18, wherein the particle size of the fine sand is in the range of 0.1 mm to 1.5 mm.

20. A laminate concrete panel as claimed in claim 18, wherein the first layer of concrete comprises a greater mass of fine sand per kg than the mass of fine sand per kg of the second layer of concrete.

21. A laminate concrete panel as claimed in claim 1, wherein the first layer and second layer of concrete each comprises an inorganic hydraulic binder.

22. A laminate concrete panel as claimed in claim 1, wherein the first layer and second layer of concrete each comprises Portland cement.

23. A laminate concrete panel as claimed in claim 22, wherein the first layer of concrete comprises a greater mass of cement per kg than the mass of cement per kg of the second layer of concrete.

24. A laminate concrete panel as claimed in claim 22, wherein the second layer comprises a high range water-reducing agent and a styrene butadiene.

25. A laminate concrete panel as claimed in claim 1, wherein the first layer and second layer of concrete each comprises silica fume.

26. A laminate concrete panel as claimed in claim 25, wherein the first layer of concrete comprises a greater mass of silica per kg than the mass of silica per kg of the second layer of concrete.

27. A laminate concrete panel as claimed in claim 1, wherein the first layer of concrete comprises a pigment.

28. A laminate concrete panel as claimed in claim 1, wherein the first layer comprises an acrylic co-polymer.

29. A laminate concrete panel as claimed in claim 1, wherein the first layer comprises a water-reducing agent.

30. A laminate concrete panel as claimed in claim 29, wherein the first layer comprises a pure acrylic co-polymer and/or a high range water-reducing agent.

31. A laminate concrete panel as claimed in claim 1, wherein the second layer of concrete comprises a pigment.

32. A laminate concrete panel as claimed in claim 1, wherein the second layer comprises a styrene butadiene.

33. A laminate concrete panel as claimed in claim 1, wherein the second layer comprises a water-reducing agent.

34. A laminate concrete panel as claimed in claim 1, wherein the laminate concrete panel is prefabricated.

* * * * *